US012245575B1

(12) United States Patent
Park et al.

(10) Patent No.: US 12,245,575 B1
(45) Date of Patent: Mar. 11, 2025

(54) APPARATUS FOR CONTROL WATER FLOW BASED ON FISH OXYGEN CONSUMPTION AND METHOD FOR CONTROL WATER FLOW USING THE SAME

(71) Applicant: PUKYONG NATIONAL UNIVERSITY INDUSTRY-UNIVERSITY COOPERATION FOUNDATION, Busan (KR)

(72) Inventors: Jeong Hwan Park, Hail-myeon (KR); Deok Gyu Kim, Busan (KR); Ji Hoon Kim, Gangneung-si (KR); Young Hun Lee, Busan (KR); Jin Seo Choi, Daegu (KR)

(73) Assignee: PUKYONG NATIONAL UNIVERSITY INDUSTRY-UNIVERSITY COOPERATION FOUNDATION, Busan (KR)

( * ) Notice: Subject to any disclaimer, the term of this patent is extended or adjusted under 35 U.S.C. 154(b) by 0 days.

(21) Appl. No.: 18/520,846

(22) Filed: Nov. 28, 2023

(30) Foreign Application Priority Data

Nov. 16, 2023 (KR) .......................... 10-2023-0159569

(51) Int. Cl.
*A01K 63/04* (2006.01)
*A01K 61/10* (2017.01)
*A01K 61/80* (2017.01)

(52) U.S. Cl.
CPC ............ *A01K 63/042* (2013.01); *A01K 61/10* (2017.01); *A01K 61/80* (2017.01)

(58) Field of Classification Search
CPC ........ A01K 61/10; A01K 61/80; A01K 61/85; A61K 63/042
See application file for complete search history.

(56) References Cited

U.S. PATENT DOCUMENTS 4,654,147 A * 3/1987 Bagley .................... C02F 3/006
 210/170.06
4,664,680 A * 5/1987 Weber .................... C02F 3/1289
 261/36.1

(Continued)

FOREIGN PATENT DOCUMENTS

CN 105010215 A * 11/2015 ............. A01K 61/00
CN 108668962 A * 10/2018 ............. A01K 61/10

(Continued)

*Primary Examiner* — Michael H Wang
(74) *Attorney, Agent, or Firm* — NORTON ROSE FULBRIGHT US LLP

(57) ABSTRACT

An apparatus for controlling a flow rate of water based on an oxygen consumption of a farming target fish is disclosed. The apparatus can include a water temperature meter for measuring a water temperature of an aquaculture tank containing the farming target fish, an automatic feeder for supplying a fish feed to the aquaculture tank, a first oxygen concentration meter for measuring an oxygen concentration in water supplied to the aquaculture tank, a second oxygen concentration meter for measuring an oxygen concentration in water discharged from the aquaculture tank, an oxygen consumption calculator configured to calculate an oxygen consumption of the farming target fish, a water flow rate calculator configured to calculate a flow rate of water to be supplied to the aquaculture tank, and a water supply configured to supply the water to the aquaculture tank.

11 Claims, 4 Drawing Sheets

(56) References Cited

U.S. PATENT DOCUMENTS

| | | | | |
|---|---|---|---|---|
| 5,133,287 A * | 7/1992 | Hicks | ............... | A01K 61/80 |
| | | | | 119/230 |
| 5,320,068 A * | 6/1994 | Redditt | ............ | A01K 63/042 |
| | | | | 119/226 |
| 5,893,337 A * | 4/1999 | Sevic | ............ | A01K 63/042 |
| | | | | 119/230 |
| 9,693,537 B2 * | 7/2017 | Stiles, Jr. | ............ | B01F 35/2132 |
| 2012/0284165 A1 * | 11/2012 | Morgenthaler | ............ | C02F 3/32 |
| | | | | 705/37 |
| 2013/0206078 A1 * | 8/2013 | Melberg | ............ | A01K 61/80 |
| | | | | 119/230 |
| 2014/0311416 A1 * | 10/2014 | Stiles, Jr. | ............ | B01F 35/82 |
| | | | | 119/263 |
| 2023/0210094 A1 * | 7/2023 | Dethlefsen | ............ | A01K 63/04 |
| | | | | 119/226 |
| 2024/0416278 A1 * | 12/2024 | Koh | ............ | B01J 20/103 |

FOREIGN PATENT DOCUMENTS

| | | | |
|---|---|---|---|
| CN | 115316314 A | * | 11/2022 |
| CN | 116602248 A | * | 8/2023 |
| WO | WO-2024100972 A1 | * | 5/2024 |

* cited by examiner

| Date | Time | Water Temperature | Feed amount | Total oxygen consumption |
|---|---|---|---|---|
| 7.13 | 10~00 | 21.2 | 3500 | 0.60915381 |
| 7.22 | 10~00 | 20.8 | 4000 | 0.732056909 |
| 8.13 | 10~00 | 26.3 | 4285 | 1.041988856 |
| 8.14 | 10~00 | 26.8 | 4285 | 1.134780698 |
| 8.15 | 10~00 | 27.0 | 4285 | 1.134972633 |
| 8.16 | 10~00 | 27.3 | 4285 | 1.135527305 |
| 8.17 | 10~00 | 27.4 | 4285 | 1.156702985 |
| 8.18 | 10~00 | 27.2 | 4285 | 1.144475097 |
| 8.19 | 10~00 | 27.3 | 4285 | 1.132783619 |
| 8.2 | 10~00 | 27.6 | 4285 | 1.172749663 |
| 8.21 | 10~00 | 28 | 4285 | 1.146563676 |
| 8.22 | 10~00 | 28.2 | 0 | 0.725366911 |

FIG. 2

APPARATUS FOR CONTROL WATER FLOW BASED ON FISH OXYGEN CONSUMPTION AND METHOD FOR CONTROL WATER FLOW USING THE SAME

CROSS-REFERENCE TO RELATED APPLICATION

This application claims a benefit under 35 U.S.C. § 119 (a) of Korean Patent Application No. 10-2023-0159569, filed on Nov. 16, 2023, on the Korean Intellectual Property Office, the entire disclosure of which is incorporated herein by reference for all purposes.

BACKGROUND

1. Field

The present disclosure relates to an apparatus for controlling a flow rate of water based on an oxygen consumption of the fish and a method for controlling a flow rate of water based on an oxygen consumption of the fish. More specifically, the present disclosure relates to an apparatus for controlling a flow rate of water based on an oxygen consumption of the fish and a method for controlling a flow rate of water based on an oxygen consumption of the fish, in which an oxygen consumption of a farming target fish is estimated, and a flow rate of the water is controlled based on the estimating result.

2. Description of Related Art

Demand for seafood is rapidly increasing as the world population and animal protein consumption increase. The fishing industry which captures fish has reached its production limit due to climate change and indiscriminate overfishing. Due to this fact, aquaculture is currently the fastest growing food production sector in the world and is a key industry contributing to future food security. Not only does aquaculture provide an important source of protein, but it may also contribute to the natural ecosystem, such as restoring habitat around fish farms and replenishing wild populations. However, with the development of intensive aquaculture, concerns are being raised that the increase in aquaculture waste may affect productivity within the farm and the surrounding aquatic ecosystem. In addition, problems such as the spread of pathogens, increased antibiotic resistance, overfishing of the fishery resources for live feed production, and introduction of invasive species are accompanied. Therefore, efforts are needed to ensure the social and environmental sustainability of the aquaculture industry.

Accordingly, interest in and importance of the recirculating aquaculture system (RAS), which is compatible with intensive fish production and environmental sustainability, is increasing. The RAS refers to a system that treats and reuses water polluted by physical, chemical and biological wastes discharged from fish farms so that aquaculture organisms may survive therein. The RAS reduces water use, treats and recycles waste, enables hygienic disease management and biological pollution control in a closed environment, and maintains a constant environment optimal for fish growth.

In a current farming system, fish are raised by keeping the oxygen concentration and water flow rate in an aquaculture tank constant. However, the oxygen consumption of the fish as a living organism is not always constant and continuously fluctuates. In particular, a time when the fish consumes the oxygen at the largest amount is a time when consuming the fish feed. Therefore, in order to induce ideal growth of the fish, an operator needs to determine an actual oxygen consumption of the fish regarding the oxygen as one of the important water quality factors.

A prior art literature to the present disclosure includes Korean Patent No. 10-2139429 (2020 Jul. 23).

SUMMARY

A purpose of the present disclosure is to provide an apparatus for controlling a flow rate of water based on an oxygen consumption of the fish and a method for controlling a flow rate of water based on an oxygen consumption of the fish, in which an oxygen consumption of a farming target fish is estimated, and a flow rate of the water is controlled based on the estimating result such that the oxygen amount optimized for the growth of the fish is supplied thereto.

A purpose of the present disclosure is to provide an apparatus for controlling a flow rate of water based on an oxygen consumption of the fish and a method for controlling a flow rate of water based on an oxygen consumption of the fish, in which a timing when the farming target fish needs a larger amount of oxygen is determined, and at that timing, the wafer flow rate is increased such that the larger amount of oxygen is supplied thereto.

A purpose of the present disclosure is to provide an apparatus for controlling a flow rate of water based on an oxygen consumption of the fish and a method for controlling a flow rate of water based on an oxygen consumption of the fish, in which an oxygen consumption model suitable for farming conditions and types of the fish is calculated and applied to a farming field.

Purposes according to the present disclosure are not limited to the above-mentioned purpose. Other purposes and advantages according to the present disclosure that are not mentioned may be understood based on following descriptions, and may be more clearly understood based on embodiments according to the present disclosure. Further, it will be easily understood that the purposes and advantages according to the present disclosure may be realized using means shown in the claims and combinations thereof.

A first aspect of the present disclosure provides an apparatus for controlling a flow rate of water based on an oxygen consumption of a farming target fish, the apparatus comprising: a water temperature meter for measuring a water temperature of an aquaculture tank containing the farming target fish; an automatic feeder for automatically supplying a fish feed to the aquaculture tank; a first oxygen concentration meter for measuring an oxygen concentration in water supplied to the aquaculture tank; a second oxygen concentration meter for measuring an oxygen concentration in water discharged from the aquaculture tank; an oxygen consumption calculator configured to calculate an oxygen consumption of the farming target fish based on the water temperature of the aquaculture tank measured by the water temperature meter and a fish feed amount supplied through the automatic feeder; a water flow rate calculator configured to calculate a flow rate of water to be supplied to the aquaculture tank, based on the oxygen consumption of the farming target fish calculated by the oxygen consumption calculator, the oxygen concentration in the supplied water measured by the first oxygen concentration meter, and the oxygen concentration in the discharged water measured by the second oxygen concentration meter; and a water supply configured to supply the water to the aquaculture tank at the water flow rate calculated from the water flow rate calculator.

In accordance with some embodiments of the apparatus, the oxygen consumption calculator is configured to calculate the oxygen consumption of the farming target fish based on a following Equation 1:

$$Z = a + bx + cy \qquad \text{Equation 1}$$

where z denotes the oxygen consumption (DO (dissolved oxygen) (mg/L)), x denotes the water temperature (° C.), and y denotes the fish feed amount (g), a denotes a compensation coefficient, b denotes a water temperature coefficient, and c denotes a fish feed amount coefficient.

In accordance with some embodiments of the apparatus, the farming target fish is an olive flounder, wherein the compensation coefficient a is −1.1041291, the water temperature coefficient b is 0.064668275, and the fish feed amount coefficient c is 0.000011157491.

In accordance with some embodiments of the apparatus, the water flow rate calculator is configured to calculate the flow rate of the water to be supplied to the aquaculture tank based on a following Equation 2:

$$Q = \frac{C_{DO}}{1{,}440 \ (C_{out} - C_{in})/1{,}000{,}000} \qquad \text{Equation 2}$$

where Q denotes the flow rate (L/min) of the water to be supplied to the aquaculture tank, $C_{out}$ denotes the oxygen concentration in the water discharged from the aquaculture tank, $C_{in}$ denotes the oxygen concentration in the water supplied to the aquaculture tank, and $C_{DO}$ denotes the oxygen consumption of the farming target fish.

In accordance with some embodiments of the apparatus, the water supply includes a variable frequency drive (VFD) pump for controlling a motor speed based on the calculated water flow rate.

In accordance with some embodiments of the apparatus, the apparatus further comprises: a memory storing therein measurement data measured at a preset time interval, wherein the measurement data include the water temperature of the aquaculture tank, the fish feed amount supplied to the aquaculture tank, the oxygen concentration in the water supplied to the aquaculture tank, and the oxygen concentration in the water discharged from the aquaculture tank; an oxygen consumption modeling unit configured to calculate an oxygen consumption model of the farming target fish based on the measurement data stored in the memory; and an application unit configured to apply the oxygen consumption model calculated by the oxygen consumption modeling unit to the oxygen consumption calculator.

A second aspect of the present disclosure provides a method for controlling a flow rate of water based on an oxygen consumption of a farming target fish, the method comprising: measuring, by a water temperature meter, a water temperature of an aquaculture tank containing the farming target fish; measuring, by an automatic feeder, a fish feed amount supplied to the aquaculture tank; measuring, by a first oxygen concentration meter, an oxygen concentration in water supplied to the aquaculture tank; measuring, by a second oxygen concentration meter, an oxygen concentration in water discharged from the aquaculture tank; calculating, by an oxygen consumption calculator, an oxygen consumption of the farming target fish, based on the water temperature of the aquaculture tank measured by the water temperature meter and the fish feed amount supplied through the automatic feeder; calculating, by a water flow rate calculator, a flow rate of water to be supplied to the aquaculture tank, based on the oxygen consumption of the farming target fish calculated by the oxygen consumption calculator, the oxygen concentration in the supplied water measured by the first oxygen concentration meter, and the oxygen concentration in the discharged water measured by the second oxygen concentration meter; and supplying, by a water supply, the water to the aquaculture tank at the water flow rate calculated from the water flow rate calculator.

In accordance with some embodiments of the method, calculating, by the oxygen consumption calculator, the oxygen consumption of the farming target fish includes calculating, by the oxygen consumption calculator, the oxygen consumption of the farming target fish, based on a following Equation 1:

$$Z = a + bx + cy \qquad \text{Equation 1}$$

where z denotes the oxygen consumption (DO (dissolved oxygen) (mg/L)), x denotes the water temperature (° C.), and y denotes the fish feed amount (g), a denotes a compensation coefficient, b denotes a water temperature coefficient, and c denotes a fish feed amount coefficient.

In accordance with some embodiments of the method, the farming target fish is an olive flounder, wherein the compensation coefficient a is −1.1041291, the water temperature coefficient b is 0.064668275, and the fish feed amount coefficient c is 0.000011157491.

In accordance with some embodiments of the method, calculating, by the water flow rate calculator, the flow rate of water to be supplied to the aquaculture tank includes calculating, by the water flow rate calculator, the flow rate of water to be supplied to the aquaculture tank, based on a following Equation 2:

$$Q = \frac{C_{DO}}{1{,}440 \ (C_{out} - C_{in})/1{,}000{,}000} \qquad \text{Equation 2}$$

where Q denotes the flow rate (L/min) of the water to be supplied to the aquaculture tank, $C_{out}$ denotes the oxygen concentration in the water discharged from the aquaculture tank, $C_{in}$ denotes the oxygen concentration in the water supplied to the aquaculture tank, and $C_{DO}$ denotes the oxygen consumption of the farming target fish.

In accordance with some embodiments of the method, the method further comprises: storing, in a memory, measurement data measured at a preset time interval, wherein the measurement data include the water temperature of the aquaculture tank, the fish feed amount supplied to the aquaculture tank, the oxygen concentration in the water supplied to the aquaculture tank, and the oxygen concentration in the water discharged from the aquaculture tank; calculating, by an oxygen consumption modeling unit, an oxygen consumption model of the farming target fish based on the measurement data stored in the memory; and applying, by an application unit, the oxygen consumption model calculated by the oxygen consumption modeling unit to the oxygen consumption calculator.

In the apparatus for controlling the flow rate of the water based on the oxygen consumption of the fish and the method for controlling the flow rate of the water based on the oxygen consumption of the fish, an oxygen consumption of a farming target fish is estimated, and a flow rate of the water is controlled based on the estimating result such that the oxygen amount optimized for the growth of the fish is supplied thereto.

In the apparatus for controlling the flow rate of the water based on an oxygen consumption of the fish and the method for controlling the flow rate of the water based on an oxygen consumption of the fish, a timing when the farming target fish needs a larger amount of oxygen is determined, and at that timing, the wafer flow rate is increased such that the larger amount of oxygen is supplied thereto.

In the apparatus for controlling the flow rate of the water based on an oxygen consumption of the fish and the method for controlling the flow rate of the water based on an oxygen consumption of the fish, the oxygen consumption model suitable for farming conditions and types of the fish is calculated and applied to a farming field.

Effects of the present disclosure are not limited to the effects mentioned above, and other effects not mentioned will be clearly understood by those skilled in the art from the descriptions below.

BRIEF DESCRIPTION OF DRAWINGS

FIG. 2 shows a result of measuring a total oxygen consumption calculated based on a water temperature of an aquaculture tank, an amount of the fish feed supplied to the aquaculture tank, and an oxygen concentration in water supplied to the aquaculture tank, and an oxygen concentration in water discharged therefrom.

DETAILED DESCRIPTIONS

Figure 1:
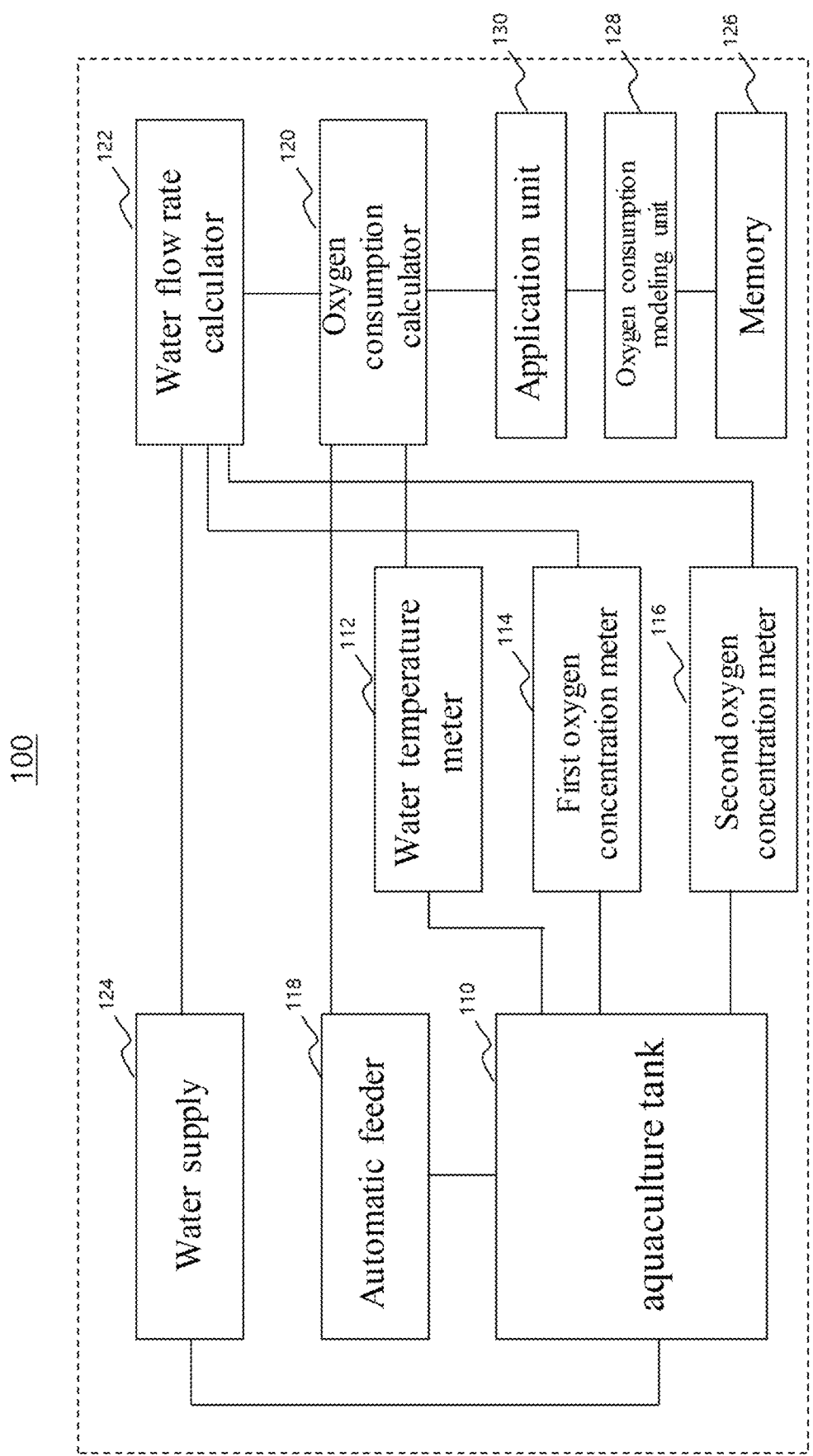
FIG. 1 is a diagram showing a configuration of an apparatus for controlling a flow rate of water based on an oxygen consumption of the fish according to an embodiment of the present disclosure.

The same reference numbers in different drawings represent the same or similar elements, and as such perform similar functionality. Further, descriptions and details of well-known steps and elements are omitted for simplicity of the description. Furthermore, in the following detailed description of the present disclosure, numerous specific details are set forth in order to provide a thorough understanding of the present disclosure. However, it will be understood that the present disclosure may be practiced without these specific details. In other instances, well-known methods, procedures, components, and circuits have not been described in detail so as not to unnecessarily obscure aspects of the present disclosure. Examples of various embodiments are illustrated and described further below. It will be understood that the description herein is not intended to limit the claims to the specific embodiments described. On the contrary, it is intended to cover alternatives, modifications, and equivalents as may include within the spirit and scope of the present disclosure as defined by the appended claims.

A shape, a size, a ratio, an angle, a number, etc. disclosed in the drawings for illustrating embodiments of the present disclosure are illustrative, and the present disclosure is not limited thereto. The same reference numerals refer to the same elements herein. Further, descriptions and details of well-known steps and elements are omitted for simplicity of the description. Furthermore, in the following detailed description of the present disclosure, numerous specific details are set forth in order to provide a thorough understanding of the present disclosure. However, it will be understood that the present disclosure may be practiced without these specific details. In other instances, well-known methods, procedures, components, and circuits have not been described in detail so as not to unnecessarily obscure aspects of the present disclosure.

The terminology used herein is for the purpose of describing particular embodiments only and is not intended to limit the present disclosure. As used herein, the singular forms "a" and "an" are intended to include the plural forms as well, unless the context clearly indicates otherwise. It will be further understood that the terms "comprise", "comprising", "include", and "including" when used in this specification, specify the presence of the stated features, integers, operations, elements, and/or components, but do not preclude the presence or addition of one or more other features, integers, operations, elements, components, and/or portions thereof.

Unless otherwise defined, all terms including technical and scientific terms used herein have the same meaning as commonly understood by one of ordinary skill in the art to which this inventive concept belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

In one example, when a certain embodiment may be implemented differently, a function or operation specified in a specific block may occur in a sequence different from that specified in a flowchart. For example, two consecutive blocks may be actually executed at the same time. Depending on a related function or operation, the blocks may be executed in a reverse sequence.

In descriptions of temporal relationships, for example, temporal precedent relationships between two events such as "after", "subsequent to", "before", etc., another event may occur therebetween unless "directly after", "directly subsequent" or "directly before" is not indicated. The features of the various embodiments of the present disclosure may be partially or entirely combined with each other, and may be technically associated with each other or operate with each other. The embodiments may be implemented independently of each other and may be implemented together in an association relationship.

Some embodiments may be described in terms of functional block components and various processing steps. Some or all of these functional blocks may be implemented as various numbers of hardware and/or software components that perform specific functions. For example, the functional blocks of the present disclosure may be implemented by one or more microprocessors, or may be implemented by circuit components for a given function. The functional blocks of the present disclosure may be implemented in a variety of programming or scripting languages. The functional blocks of the present disclosure may be implemented as algorithms executed on one or more processors. A function performed by a function block of the present disclosure may be performed by a plurality of function blocks, or functions performed by a plurality of function blocks of the present disclosure may be performed by a single function block. Furthermore, the present disclosure may employ prior art techniques for electronic configuration setting, signal processing, and/or data processing.

Terms such as '... unit' as used hereinafter mean a unit that processes at least one function or operation, and which may be implemented in hardware or software, or a combination of hardware and software.

It will be understood that, although the terms "first", "second", "third", and so on may be used herein to describe various elements, components, regions, layers and/or sections, these elements, components, regions, layers and/or sections should not be limited by these terms. These terms are used to distinguish one element, component, region, layer or section from another element, component, region, layer or section. Thus, a first element, component, region, layer or section described below could be termed a second element, component, region, layer or section, without departing from the spirit and scope of the present disclosure.

Various embodiments of the present disclosure as described below are based on a hardware scheme by way of example. However, the present disclosure is not limited thereto. Because the various embodiments of the present disclosure include using both hardware and software, the various embodiments of the present disclosure do not exclude a software-based scheme.

Hereinafter, specific details for implementing the apparatus for controlling the flow rate of the water based on the oxygen consumption of the fish according to the present disclosure and the method for controlling the flow rate of the water using the same are described as follows.

FIG. 1 is a diagram showing a configuration of the apparatus for controlling the flow rate of the water based on the oxygen consumption of the fish according to an embodiment of the present disclosure.

Referring to FIG. 1, an apparatus 100 for controlling the flow rate of the water based on the oxygen consumption of the fish includes a water temperature meter 112, a first oxygen concentration meter 114, a second oxygen concentration meter 116, an automatic feeder 118, an oxygen consumption calculator 120, a water flow rate calculator 122, a water supply 124, a memory 126, an oxygen consumption modeling unit 128, and an application unit 130.

The apparatus 100 for controlling the flow rate of the water based on the oxygen consumption of the fish may be configured to estimate the oxygen consumption of the farming target fish in the aquaculture tank 100 and control the flow rate of the water based on the estimating result so as to supply the oxygen necessary for the growth of the fish thereto. For example, the apparatus 100 for controlling the flow rate of the water based on the oxygen consumption of the fish may estimate the oxygen consumption of the fish and supply an appropriate amount of oxygen to each of time periods to the aquaculture tank 100, based on the estimating result.

The farming target fish may be accommodated in the aquaculture tank 110. For example, the aquaculture tank 110 may correspond to a circular aquaculture tank with a diameter of 4 m, a height of 0.4 m, and a volume of 5 tons. Hereinafter, for convenience of illustration, the description will be made under assumption that olive flounder is received and cultivated in the aquaculture tank 110.

The water temperature meter 112 measures the water temperature of the aquaculture tank 110 containing the farming target fish, and the first oxygen concentration meter 114 measures the oxygen concentration in the water supplied to the aquaculture tank 110. The second oxygen concentration meter 116 measures the oxygen concentration in the water discharged from the aquaculture tank 110. In one embodiment, the water temperature meter 112, the first oxygen concentration meter 114, and the second oxygen concentration meter 116 may measure the water temperature and the oxygen concentration, respectively, at a preset time interval.

In one embodiment, the water temperature meter 112, the first oxygen concentration meter 114, and the second oxygen concentration meter 116 may measure the water temperature and the oxygen concentration, respectively, at one minute interval for 14 hours from 10:00 AM to 24:00 PM. Each of the water temperature meter 112, the first oxygen concentration meter 114, and the second oxygen concentration meter 116 may store each of the measured values in the memory 126.

The automatic feeder 118 automatically supplies the fish feed to the aquaculture tank 110. In one embodiment, the automatic feeder 118 may supply a preset amount of the fish feed to the aquaculture tank 110 at a preset time depending on the type of the farming target fish. For example, the automatic feeder 118 may supply the fish feed to the aquaculture tank 110 based on a fish feed supply amount according to a fish body size and a water temperature in the National Institute of Fisheries Science-Halibut Breeding Manual. For example, the automatic feeder 118 may supply the fish feed to the aquaculture tank 110 in a distributed manner of the fish feed amount three times a day at 10:00 AM, 13:00 PM, and 16:00 PM.

The automatic feeder 118 may measure the amount of the fish feed supplied to the aquaculture tank 110 and store the measurement in the memory 126.

The oxygen consumption calculator 120 calculates the oxygen consumption of the farming target fish accommodated in the aquaculture tank 110 based on the water temperature of the aquaculture tank measured by the water temperature meter 112 and the fish feed amount supplied through the automatic feeder 118. In one embodiment, the oxygen consumption calculator 120 may calculate the oxygen consumption of the farming target fish accommodated in the aquaculture tank 110 using a following Equation 1:

$$Z = a + bx + cy \quad \text{Equation 1}$$

where z denotes the oxygen consumption (DO (dissolved oxygen) (mg/L)), x denotes the water temperature (° C.), and y denotes the fish feed amount (g). a denotes a compensation coefficient, b denotes a water temperature coefficient, and c denotes a fish feed amount coefficient.

In one embodiment, in calculating the oxygen consumption of the olive flounder, the compensation coefficient a may be −1.1041291, the water temperature coefficient b may be 0.064668275, and the fish feed amount coefficient c may be 0.000011157491.

Figure 3:
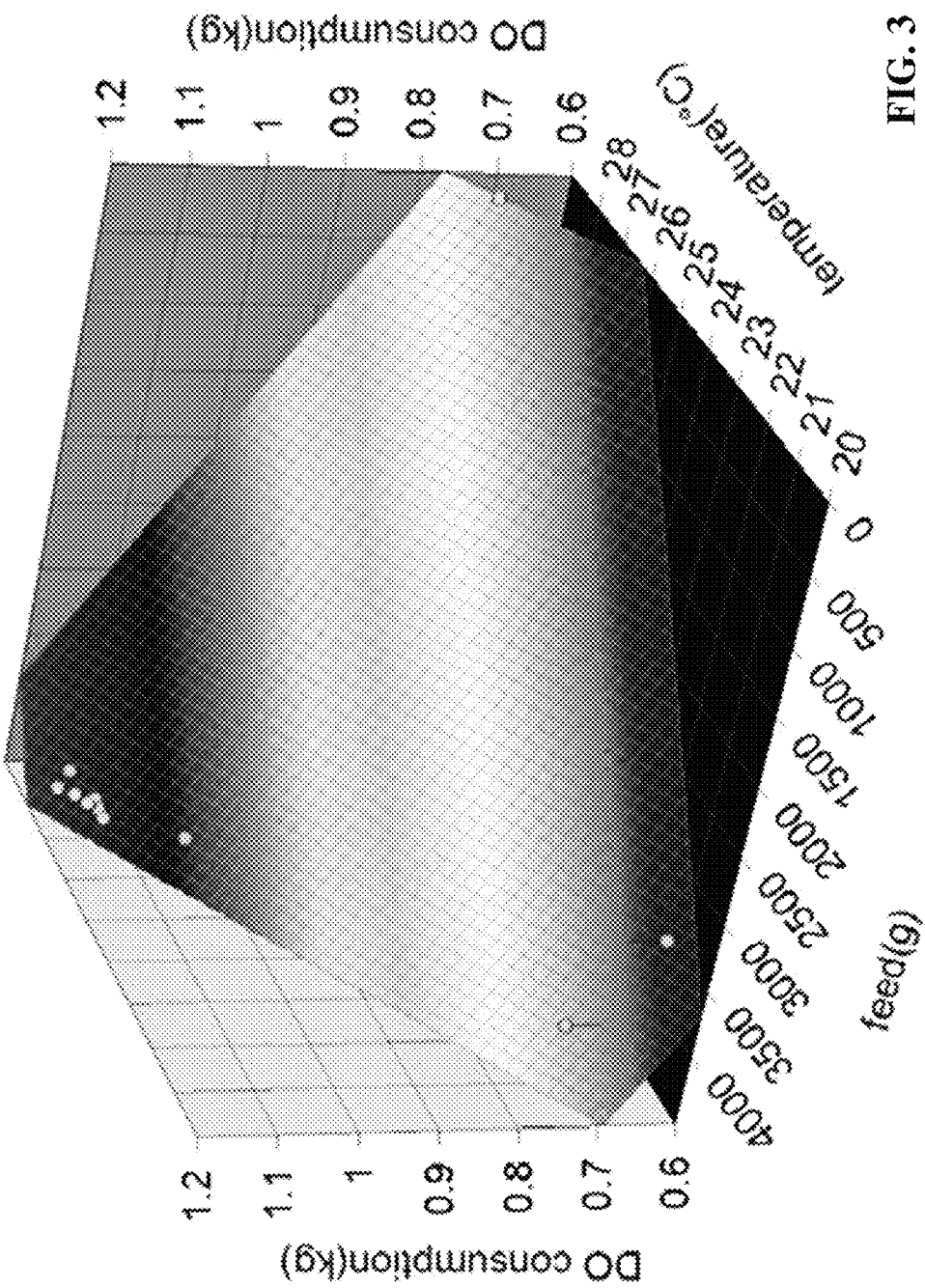
FIG. 3 is a diagram showing a result of calculating an oxygen consumption model based on the result of FIG. 2.

FIG. 2 is a diagram showing a result of measuring a total oxygen consumption calculated based on the water temperature of the aquaculture tank, the amount of the fish feed supplied to the aquaculture tank, the oxygen concentration in the water supplied to the aquaculture tank, and the oxygen concentration in the water discharged therefrom. FIG. 3 is a diagram showing a result of calculating the oxygen consumption model based on the result of FIG. 2.

FIG. 2 is a table indicating the water temperature (C), the supplied fish feed amount (g), and the total oxygen consumption (DO (mg/L)) of the fish as measured for 14 hours from 10:00 AM to 24:00 PM on July 13, July 22, August 13, August 14, August 15, August 16, August 17, August 18, August 19, August 20, August 21, and August 22.

The total oxygen consumption consumed by the farming target fish on each day may be calculated as follows. A total oxygen consumption consumed by the farming target fish in the aquaculture tank for 1 minute may be calculated by [(an oxygen concentration (DO (mg/L)) in the water supplied to the aquaculture tank for 1 minute)−(the oxygen concentration (DO (mg/L)) in the water discharged from the aquaculture tank)]×(an amount (L/min) of the water supplied to the aquaculture tank for 1 minute). The oxygen consumptions consumed by the fish for each 1 minute for a period from 10:00 AM to 24:00 PM may be summed with each other to calculate the total oxygen consumption consumed by the farming target fish from 10:00 AM to 24:00 PM on that day.

Referring to FIG. 3, FIG. 3 is a diagram showing a result of a regression analysis of the oxygen consumption calculated using the water temperature (° C.) and the fish feed amount (g) based on the result of FIG. 2 as variables. It may be identified based on the result of multiple linear regression analysis using the oxygen consumption as a dependent variable and using the water temperature (° C.) and the fish feed amount (g) as independent variables (model Equation: Equation 1) that the compensation coefficient a is calculated as −1.1041291, the water temperature coefficient b is calculated as 0.064668275, and the fish feed amount coefficient c is calculated as 0.000011157491. It may be identified that an adjusted R-squared value is 0.97520672, and a calculated regression analysis value has a reliability of 97.5%. It may be identified based on the calculated oxygen consumption model that as the water temperature increases or the fish feed amount increases, the oxygen consumption of the olive flounder also increases.

Referring again to FIG. 1, the water flow rate calculator 122 may calculate the flow rate of the water to be supplied to the aquaculture tank 110 based on the oxygen consumption of the farming target fish calculated the oxygen consumption calculator 120, the oxygen concentration in the supplied water measured by the first oxygen concentration meter 114, and the second oxygen concentration in the discharged water measured by the oxygen concentration meter 116.

In one embodiment, the water flow rate calculator 122 may calculate the flow rate of the water to be supplied to the aquaculture tank 110 using a following Equation 2:

$$Q = \frac{C_{DO}}{1{,}440\ (C_{out} - C_{in})/1{,}000{,}000} \quad \text{Equation 2}$$

where Q denotes the flow rate of the water (L/min), $C_{out}$ denotes the oxygen concentration in the water discharged from the aquaculture tank 110, $C_{in}$ denotes the oxygen concentration in the water supplied to the aquaculture tank 110, and $C_{DO}$ denotes the oxygen consumption of the farming target fish. Each of 1,440 and 1,000,000 denotes a unit conversion constant.

The water flow rate calculator 122 may calculate the flow rate of the water to be supplied to the aquaculture tank 110, in real time, based on the oxygen consumption of the farming target fish which changes depending on the water temperature (° C.) and the fish feed amount (g).

The water supply 124 supplies the water the aquaculture tank 110 at the water flow rate calculated by the water flow rate calculator 122. In one embodiment, the water supply 124 may include a variable frequency drive (VFD) pump that controls a motor speed based on the water flow rate value calculated by the water flow rate calculator 122. The VFD pump may control the motor speed by changing a frequency and a voltage.

The memory 126 may store therein measurement data measured at the preset time interval. The measurement data may include the water temperature of the aquaculture tank 110, the fish feed amount supplied to the aquaculture tank 110, the oxygen concentration in the water supplied to the aquaculture tank 110, and the oxygen concentration in the water discharged from the aquaculture tank 110. The water temperature, the fish feed amount, and the oxygen concentration may be stored in the memory 126 in association with a time at which each of the water temperature, the fish feed amount, and the oxygen concentration is measured.

The oxygen consumption modeling unit 128 calculates an oxygen consumption model of the farming target fish based on the measurement data stored in the memory 126. In one embodiment, the oxygen consumption modeling unit 128 may perform regression analysis on n data stored in the memory 126, based on a model using the water temperature (° C.) and the fish feed amount (g) as the variables and using the oxygen consumption as the calculated value, thereby calculating the oxygen consumption model. The number n (n being a natural number) of the data subjected to the regression analysis may be preset by an operator or a designer.

The oxygen consumption modeling unit 128 may calculate the oxygen consumption model at a preset time interval (for example, 1 day or 1 month, etc.). In another embodiment, the oxygen consumption modeling unit 128 may calculate the oxygen consumption model for a preset recent period (for example, the last 7 days, 15 days, or the last 1 month, etc.). In another embodiment, the oxygen consumption modeling unit 128 may calculate the oxygen consumption model according to a period during which a growth stage of the farming target fish transitions from one stage to another stage (for example, from a fry stage to an adult stage).

The application unit 130 may apply the oxygen consumption model calculated by the oxygen consumption modeling unit 128 to the oxygen consumption calculator 120.

Figure 4:
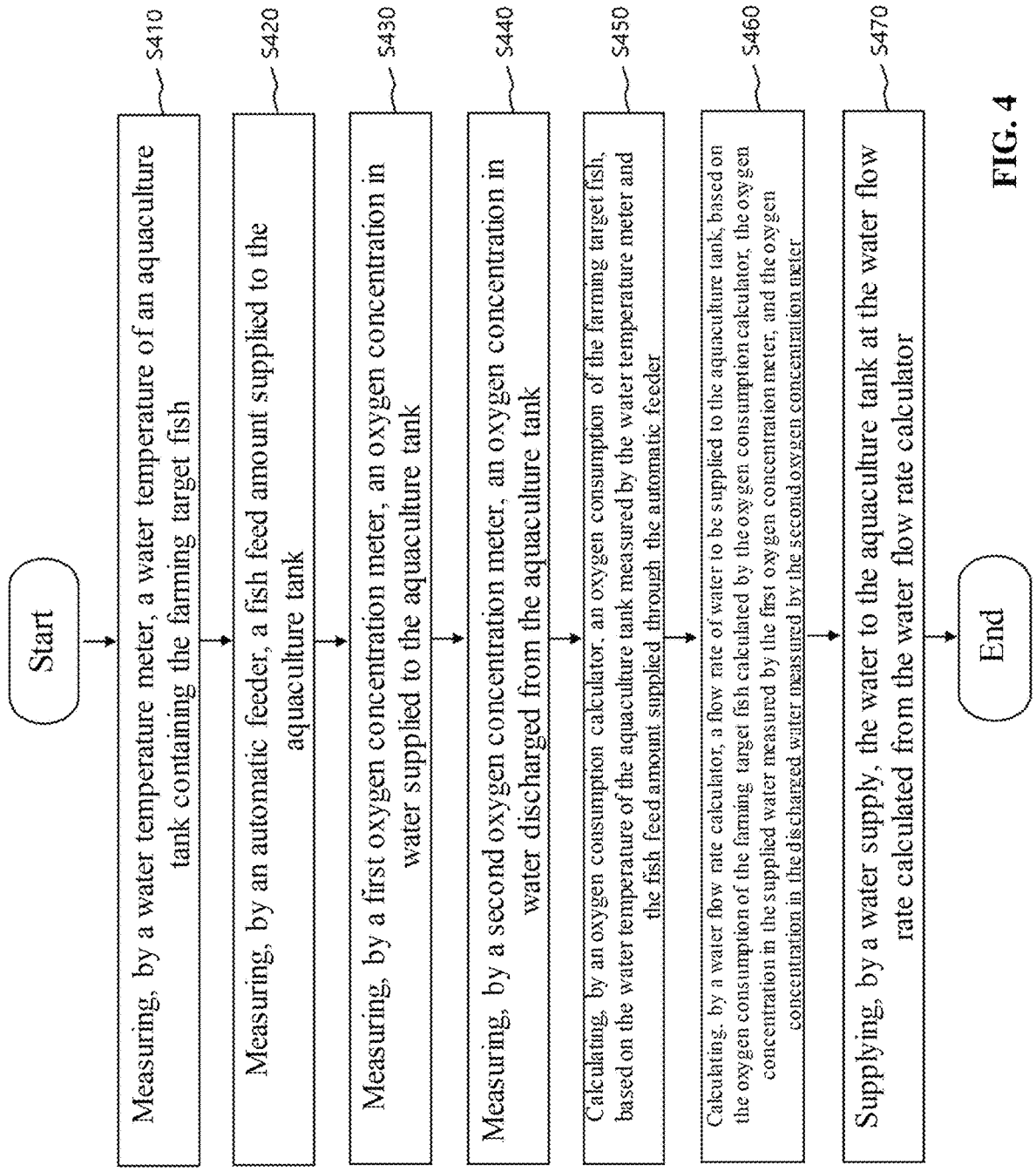
FIG. 4 is a flow chart illustrating a method for controlling the flow rate of the water based on the oxygen consumption of the fish according to an embodiment of the present disclosure.

FIG. 4 is a flowchart for illustrating a method for controlling the flow rate of the water based on the oxygen consumption of the fish according to an embodiment of the present disclosure.

Referring to FIG. 4, the water temperature meter 112 measures the water temperature of the aquaculture tank 110 containing the farming target fish in S410, and the automatic feeder 114 providing the fish feed to the aquaculture tank 110 measures the fish feed amount in S420.

The first oxygen concentration meter 114 measures the oxygen concentration in the water supplied to the aquaculture tank 110 in S430, and the second oxygen concentration meter 116 measures the oxygen concentration in the water discharged from the aquaculture tank 110 in S440.

The oxygen consumption calculator 120 calculates the oxygen consumption of the farming target fish based on the water temperature of the aquaculture tank 110 measured by the water temperature meter 112 and the fish feed amount supplied through the automatic feeder 114 in S450.

In one embodiment, the oxygen consumption calculator 120 may calculate the oxygen consumption of the farming target fish accommodated in the aquaculture tank 110 using the following Equation 1:

$$Z = a + bx + cy \quad \text{Equation 1}$$

where z denotes the oxygen consumption (DO (dissolved oxygen) (mg/L)), x denotes the water temperature (° C.), and y denotes the fish feed amount (g). a denotes a compensation coefficient, b denotes a water temperature coefficient, and c denotes a fish feed amount coefficient.

In one embodiment, in calculating the oxygen consumption of the olive flounder, the compensation coefficient a may be −1.1041291, the water temperature coefficient b may be 0.064668275, and the fish feed amount coefficient c may be 0.000011157491.

The water flow rate calculator 122 may calculate the flow rate of the water to be supplied to the aquaculture tank 110 based on the oxygen consumption of the farming target fish calculated the oxygen consumption calculator 120, the oxygen concentration in the supplied water measured by the first oxygen concentration meter 114, and the second oxygen concentration in the discharged water measured by the oxygen concentration meter 116 in S460.

In one embodiment, the water flow rate calculator 122 may calculate the flow rate of the water to be supplied to the aquaculture tank 110 using the following Equation 2:

$$Q = \frac{C_{DO}}{1{,}440\ (C_{out} - C_{in})/1{,}000{,}000} \qquad \text{Equation 2}$$

where Q denotes the flow rate of the water (L/min), $C_{out}$ denotes the oxygen concentration in the water discharged from the aquaculture tank 110, $C_{in}$ denotes the oxygen concentration in the water supplied to the aquaculture tank 110, and $C_{DO}$ denotes the oxygen consumption of the farming target fish. Each of 1,440 and 1,000,000 denotes a unit conversion constant.

The water flow rate calculator 122 may calculate the flow rate of the water to be supplied to the aquaculture tank 110, in real time, based on the oxygen consumption of the farming target fish which changes depending on the water temperature (° C.) and the fish feed amount (g).

The water supply 124 supplies the water the aquaculture tank 110 at the water flow rate calculated by the water flow rate calculator 122 in S470. In one embodiment, the water supply 124 may include a variable frequency drive (VFD) pump that controls a motor speed based on the water flow rate value calculated by the water flow rate calculator 122. The VFD pump may control the motor speed by changing a frequency and a voltage.

In one embodiment, the method may further include storing measurement data measured at the preset time interval into the memory 126. The measurement data may include the water temperature of the aquaculture tank 110, the fish feed amount supplied to the aquaculture tank 110, the oxygen concentration in the water supplied to the aquaculture tank 110, and the oxygen concentration in the water discharged from the aquaculture tank 110. The water temperature, the fish feed amount, and the oxygen concentration may be stored in the memory 126 in association with a time at which each of the water temperature, the fish feed amount, and the oxygen concentration is measured.

In one embodiment, the method may further include a step in which the oxygen consumption modeling unit 128 calculates an oxygen consumption model of the farming target fish based on the measurement data stored in the memory 126.

In one embodiment, one embodiment, the method may further include a step in which the application unit 130 applies the oxygen consumption model calculated by the oxygen consumption modeling unit 128 to the oxygen consumption calculator 120.

Some components and steps in the method and apparatus for controlling the flow rate of the water based on the oxygen consumption of the fish, as described above in FIGS. 1 to 4 may also be implemented in a form of a computer program recorded in a recording medium including instructions executable by a computer.

Although the present disclosure has been described based on the embodiments, the technical idea of the present disclosure is not limited to the above embodiments. Without departing from the technical spirit of the present disclosure, the method and apparatus for controlling the flow rate of the water based on the oxygen consumption of the fish may be implemented in various manners.

Although the embodiments of the present disclosure have been described above with reference to the accompanying drawings, the present disclosure may not be limited to the embodiments and may be implemented in various different forms. Those of ordinary skill in the technical field to which the present disclosure belongs will be able to understand that the present disclosure may be implemented in other specific forms without changing the technical idea or essential features of the present disclosure. Therefore, it should be understood that the embodiments as described above are not restrictive but illustrative in all respects.

What is claimed is:

1. An apparatus for controlling a flow rate of water based on an oxygen consumption of a farming target fish, the apparatus comprising:
   a water temperature meter for measuring a water temperature of an aquaculture tank containing the farming target fish;
   an automatic feeder for automatically supplying a fish feed to the aquaculture tank;
   a first oxygen concentration meter for measuring an oxygen concentration in water supplied to the aquaculture tank;
   a second oxygen concentration meter for measuring an oxygen concentration in water discharged from the aquaculture tank;
   an oxygen consumption calculator configured to calculate an oxygen consumption of the farming target fish based on the water temperature of the aquaculture tank measured by the water temperature meter and a fish feed amount supplied through the automatic feeder;
   a water flow rate calculator configured to calculate a flow rate of water to be supplied to the aquaculture tank, based on the oxygen consumption of the farming target fish calculated by the oxygen consumption calculator, the oxygen concentration in the supplied water measured by the first oxygen concentration meter, and the oxygen concentration in the discharged water measured by the second oxygen concentration meter; and
   a water supply configured to supply the water to the aquaculture tank at the water flow rate calculated from the water flow rate calculator.

2. The apparatus of claim 1, wherein the oxygen consumption calculator is configured to calculate the oxygen consumption of the farming target fish based on a following Equation 1:

$$Z = a + bx + cy \qquad \text{Equation 1}$$

where z denotes the oxygen consumption (DO (dissolved oxygen) (mg/L)), x denotes the water temperature (° C.), and y denotes the fish feed amount (g), a denotes a compensation coefficient, b denotes a water temperature coefficient, and c denotes a fish feed amount coefficient.

3. The apparatus of claim 2, wherein the farming target fish is an olive flounder, wherein the compensation coefficient a is −1.1041291, the water temperature coefficient b is 0.064668275, and the fish feed amount coefficient c is 0.000011157491.

4. The apparatus of claim 2, wherein the water flow rate calculator is configured to calculate the flow rate of the water to be supplied to the aquaculture tank based on a following Equation 2:

$$Q = \frac{C_{DO}}{1{,}440\ (C_{out} - C_{in})/1{,}000{,}000} \qquad \text{Equation 2}$$

where Q denotes the flow rate (L/min) of the water to be supplied to the aquaculture tank, $C_{out}$ denotes the oxygen concentration in the water discharged from the aquaculture tank, $C_{in}$ denotes the oxygen concentration in the water supplied to the aquaculture tank, and $C_{DO}$ denotes the oxygen consumption of the farming target fish.

5. The apparatus of claim 1, wherein the water supply includes a variable frequency drive (VFD) pump for controlling a motor speed based on the calculated water flow rate.

6. The apparatus of claim 1, wherein the apparatus further comprises:
- a memory storing therein measurement data measured at a preset time interval, wherein the measurement data include the water temperature of the aquaculture tank, the fish feed amount supplied to the aquaculture tank, the oxygen concentration in the water supplied to the aquaculture tank, and the oxygen concentration in the water discharged from the aquaculture tank;
- an oxygen consumption modeling unit configured to calculate an oxygen consumption model of the farming target fish based on the measurement data stored in the memory; and
- an application unit configured to apply the oxygen consumption model calculated by the oxygen consumption modeling unit to the oxygen consumption calculator.

7. A method for controlling a flow rate of water based on an oxygen consumption of a farming target fish, the method comprising:
- measuring, by a water temperature meter, a water temperature of an aquaculture tank containing the farming target fish;
- measuring, by an automatic feeder, a fish feed amount supplied to the aquaculture tank;
- measuring, by a first oxygen concentration meter, an oxygen concentration in water supplied to the aquaculture tank;
- measuring, by a second oxygen concentration meter, an oxygen concentration in water discharged from the aquaculture tank;
- calculating, by an oxygen consumption calculator, an oxygen consumption of the farming target fish, based on the water temperature of the aquaculture tank measured by the water temperature meter and the fish feed amount supplied through the automatic feeder;
- calculating, by a water flow rate calculator, a flow rate of water to be supplied to the aquaculture tank, based on the oxygen consumption of the farming target fish calculated by the oxygen consumption calculator, the oxygen concentration in the supplied water measured by the first oxygen concentration meter, and the oxygen concentration in the discharged water measured by the second oxygen concentration meter; and
- supplying, by a water supply, the water to the aquaculture tank at the water flow rate calculated from the water flow rate calculator.

8. The method of claim 7, wherein calculating, by the oxygen consumption calculator, the oxygen consumption of the farming target fish includes calculating, by the oxygen consumption calculator, the oxygen consumption of the farming target fish, based on a following Equation 1:

$$Z = a + bx + cy \qquad \text{Equation 1}$$

where z denotes the oxygen consumption (DO (dissolved oxygen) (mg/L)), x denotes the water temperature (° C.), and y denotes the fish feed amount (g), a denotes a compensation coefficient, b denotes a water temperature coefficient, and c denotes a fish feed amount coefficient.

9. The method of claim 8, wherein the farming target fish is an olive flounder, wherein the compensation coefficient a is −1.1041291, the water temperature coefficient b is 0.064668275, and the fish feed amount coefficient c is 0.000011157491.

10. The method of claim 7, wherein calculating, by the water flow rate calculator, the flow rate of water to be supplied to the aquaculture tank includes calculating, by the water flow rate calculator, the flow rate of water to be supplied to the aquaculture tank, based on a following Equation 2:

$$Q = \frac{C_{DO}}{1{,}440\ (C_{out} - C_{in})/1{,}000{,}000} \qquad \text{Equation 2}$$

where Q denotes the flow rate (L/min) of the water to be supplied to the aquaculture tank, $C_{out}$ denotes the oxygen concentration in the water discharged from the aquaculture tank, $C_{in}$ denotes the oxygen concentration in the water supplied to the aquaculture tank, and $C_{DO}$ denotes the oxygen consumption of the farming target fish.

11. The method of claim 7, wherein the method further comprises:
- storing, in a memory, measurement data measured at a preset time interval, wherein the measurement data include the water temperature of the aquaculture tank, the fish feed amount supplied to the aquaculture tank, the oxygen concentration in the water supplied to the aquaculture tank, and the oxygen concentration in the water discharged from the aquaculture tank;
- calculating, by an oxygen consumption modeling unit, an oxygen consumption model of the farming target fish based on the measurement data stored in the memory; and
- applying, by an application unit, the oxygen consumption model calculated by the oxygen consumption modeling unit to the oxygen consumption calculator.

\* \* \* \* \*